Sept. 6, 1949.   L. GOLDBERG   2,480,850
NONSPILL BATTERY PLUG
Filed June 5, 1944

Inventor
Leo Goldberg,
By W Glenn Jones
Attorney

Patented Sept. 6, 1949

2,480,850

UNITED STATES PATENT OFFICE 2,480,850

NONSPILL BATTERY PLUG

Leo Goldberg, United States Navy

Application June 5, 1944, Serial No. 538,715

2 Claims. (Cl. 277—61)

(Granted under the act of March 3, 1883, as amended April 30, 1928; 370 O. G. 757)

This invention relates to non-spill plugs for liquid containing receptacles, and more particularly to non-spill vent plugs for an aircraft storage battery.

Storage battery cells are required to be vented to permit an escape of the gases evolved by the cells. In those applications, however, where such batteries are liable to be tilted or inverted during service, such as the case with batteries for aeronautical use, it has often been found that the vent closing mechanism has become frozen or stuck in a closed position thereby preventing all escape of acid or gas leakage resulting in damage to the battery due to the gas pressure forcing its way through the battery sealing compound itself.

It is an object of the invention to provide in a vent plug for use in a liquid containing battery a means to permit the exhaust of gases evolved in the cells without the spilling of the electrolyte should the battery become tilted beyond a safe angle.

It is another object of the invention to provide a non-spill plug for liquid containing batteries that may be easily and quickly disassembled for inspection and service, if required.

With the above and other objects in view the invention consists in the construction, combination and arrangement of parts as will be described more fully hereinafter.

Figure 1:
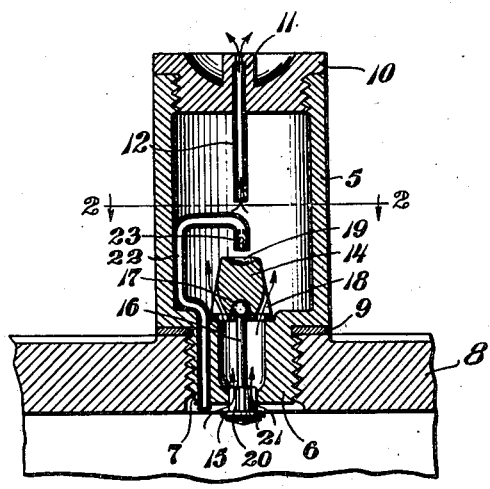
Figure 2:
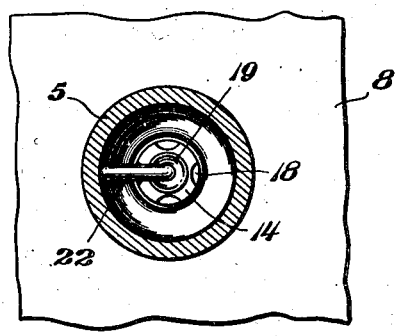

Reference is to be had to the accompanying drawings, forming a part of this specification, in which like reference characters indicate corresponding parts throughout the several views, and in which Fig. 1 is a vertical sectional view of the improved plug, Fig. 2 is a section on the line 2—2 of Fig. 1.

Figure 3:
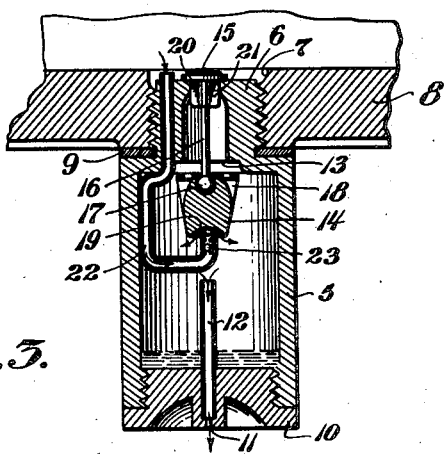
Figure 4:
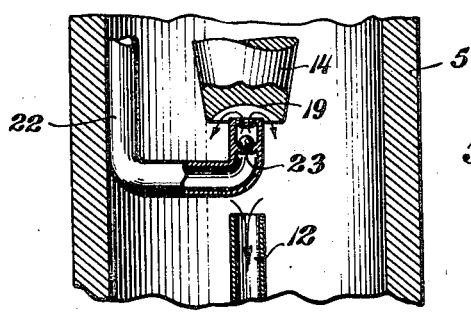

Fig. 3 is a similar view showing the position of the plug when the battery is in an inverted position, and Fig. 4 is an enlarged view of a portion of Fig. 3.

Referring more particularly to the drawings, the non-spill plug comprises a cylindrical shell or casing 5 having a smaller diameter extension 6 at the bottom which threads into the filler opening 7 provided in the cover 8 of a storage battery, there being an annular gasket 9 between the casing and the cover to form a tight seal therebetween. Threaded into the upper end of the casing is a removable cap 10 having an axial vent opening 11 into which is secured a gas outlet tube 12 for the escape of gases to the atmosphere. A weighted valve structure closes the opening 13 between the plug chamber and the battery cell. This valve structure comprises a weight 14 made from any suitable acid-resistant material to which a valve 15 is attached by a stem 16 having a ball and socket connection 17 to the weight to permit tilting of the weight without interfering with the function of the valve. The weight is axially cut-away along a portion of its lower periphery to form passages 18 through which the gases may pass from the battery cell to the plug chamber when the valve is open, and concave on its upper face, as at 19. The valve itself is a rubber or rubber-like disc adapted to seat and close the opening 13 to prevent spilling of the electrolyte when the battery is tilted. A guide member 20 having a plurality of fins 21 is slidable through the mouth of the opening 13. Normally the valve is held from its seat by the weight permitting the flow of evolved gases between the fins, through the passages and gas outlet tube to atmosphere.

However, when the battery is tilted beyond a safe angle, the weight causes the valve 15 to seat itself tightly closing the egress for the gases from the cell, resulting in an increase in pressure within the cell, which may cause a breakdown of the battery due to harmful internal pressure. It has been found, in some instances that the valve has become frozen or stuck in the open position due to swelling. If the battery should be tilted beyond the angle of spill, when the valve is in open position, the electrolyte will spill through the valve, not only causing a loss of electrolyte but also possibly causing serious damage to the battery itself.

To overcome these disadvantages there is employed what may be termed an equalizing tube 22 extending through the smaller-diameter portion of the plug into the battery cell for approximately a quarter of an inch. The interior portion of the tube is substantially U-shaped with one leg terminating in close proximity to the concave portion of the weight when the valve is in closed position, as more clearly shown in Fig. 4. In this leg there is a floating lead ball valve 23 that is actuated by the pressure in the equalizing tube. When the battery is in up-side-down position with the valve properly closed, the gas and electrolyte will naturally follow a line of least resistance and flow through the equalizing tube relieving the internal pressure of the cell. The ball valve should be so constructed that it will rise and fall depending on the pressure exerted against it by the gases in the tube, thus acting as a breather valve to control the outlet to relieve the built-up pressure of the gases. It would be natural for some of the electrolyte to seep through the equalizing tube into the plug chamber when the battery is tilted, but none of this seepage will be lost until its level has risen to the point where it will overflow through tube 12. In order that as much of the seepage as possible may be retained in the plug, it is desirable to have the tube 12 extend down into the plug chamber as far as possible. Any of the electrolyte that has been retained in the plug will flow back into the cell when the battery is righted and the valve again opened.

It will thus be seen that there has been provided a non-spill plug for a storage battery for aeronautical use that prevents a damaging accumulation of gases at all times regardless of the position in which the battery may be. Also, by the construction described above, there is provided a plug that will permit ample egress of evolved gases regardless of whether the valve is in an open or closed position to relieve the battery of any undue internal pressure. Further, it will be noted that the entire plug may be readily disassembled for inspection at regular check periods for wear and cleanliness and service when required, thereby reducing battery failures to a minimum. Access to the interior of the plug is had by removing the cap 10, and by removing the valve disc 15, which is secured to the stem 16 by any suitable means, and the equalizing tube 22, permitting removal of the valve assembly through the cap opening.

It will be understood that the above description and accompanying drawings comprehend only the general and preferred embodiment of the invention and that various changes in details of construction, proportion and arrangement of parts may be made within the scope of the appended claims and without sacrificing any of the advantages of the invention.

The invention described herein may be manufactured and used by or for the Government of the United States for governmental purposes without the payment to me of any royalty thereon.

What is claimed is:

1. A non-spill vent plug comprising a hollow body member having a vent in the top thereof and a reduced lower portion adapted to be fitted into the opening of a battery cell cover, said reduced portion having a closable port therethrough, a valve adapted to close the port when the battery is tilted from its normal vertical position, a weight connected to and controlling the movement of the valve, and a conduit adapted to extend from the battery cell to the interior of the body member to permit the emission of gas evolved in the cell, said conduit having its discharge end pointing towards the weight and engageable therewith when the valve is in a closed position whereby the weight serves as a diffuser.

2. A non-spill vent plug comprising a hollow body having a vent orifice in its top, a gas emitting tube fitted into the vent and extending substantially into the body, said body being provided with a reduced end portion adapted to be fitted into the opening of a battery cell, a weight controlled valve structure operable through the reduced body portion to prevent leaking therethrough when the battery is tilted beyond a safe position, and a tube extending through the reduced body portion to equalize gas pressure on opposite sides of the valve, said tube having its extending end engageable with said structure to be substantially closed thereby.

LEO GOLDBERG.

REFERENCES CITED

The following references are of record in the file of this patent:

UNITED STATES PATENTS

| Number | Name | Date |
| --- | --- | --- |
| 850,913 | Edison | Apr. 23, 1907 |
| 1,105,608 | Bennett | Aug. 4, 1914 |
| 1,107,084 | Mason | Aug. 11, 1914 |
| 1,486,985 | Monahan | Mar. 18, 1924 |
| 1,914,114 | Estes | June 13, 1933 |
| 1,942,645 | Graf | Jan. 9, 1934 |
| 2,028,113 | Woodbridge | Jan. 14, 1936 |
| 2,092,214 | Janko | Sept. 7, 1937 |
| 2,306,974 | Oestermeyer et al. | Dec. 29, 1942 |
| 2,349,137 | Brown | May 16, 1944 |